(12) United States Patent
Yamazaki et al.

(10) Patent No.: US 8,858,046 B2
(45) Date of Patent: Oct. 14, 2014

(54) CONTROL APPARATUS FOR VEHICLE LAMP, VEHICLE LIGHTING SYSTEM, AND VEHICLE LAMP

(75) Inventors: Masashi Yamazaki, Shizuoka (JP); Kazuo Goto, Shizuoka (JP); Toshikazu Tomono, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 453 days.

(21) Appl. No.: 13/156,937

(22) Filed: Jun. 9, 2011

(65) Prior Publication Data

US 2011/0317439 A1    Dec. 29, 2011

(30) Foreign Application Priority Data

Jun. 28, 2010   (JP) ................... 2010-146526

(51) Int. Cl.
*B60Q 1/04*   (2006.01)

(52) U.S. Cl.
USPC .......................................... 362/465; 362/466

(58) Field of Classification Search
USPC ................ 362/464, 465, 466; 701/49
See application file for complete search history.

(56) References Cited

U.S. PATENT DOCUMENTS

| | | | |
|---|---|---|---|
| 5,896,011 A | 4/1999 | Zillgitt | |
| 6,430,521 B1 * | 8/2002 | Toda | 362/465 |
| 7,086,763 B2 * | 8/2006 | Okumura et al. | 362/466 |

FOREIGN PATENT DOCUMENTS

| | | |
|---|---|---|
| CN | 1415889 A | 5/2003 |
| CN | 101181886 A | 5/2008 |
| JP | 2000-085459 A | 3/2000 |
| JP | 2000-247178 A | 9/2000 |
| JP | 2004-314856 A | 11/2004 |
| JP | 2006-27300 A | 2/2006 |

OTHER PUBLICATIONS

Office Action dated Aug. 28, 2013 issued by the State Intellectual Property Office of P.R. China in corresponding Chinese Patent Application No. 201110179472.4.

* cited by examiner

*Primary Examiner* — Y My Quach Lee
(74) *Attorney, Agent, or Firm* — Sughrue Mion, PLLC (57) ABSTRACT

A control apparatus of a vehicle lamp is provided with a reception section (228L1, 228R1), a control section (228, 228L, 228R) and a transmission section (228L3, 228R3). The reception section (228L1, 228R1) receives a tilt angle of a vehicle relative to a horizontal plane from a tilt detection device (316). The control section (228, 228L, 228R) corrects the tilt angle obtained from the tilt detection device (316) based on correction information obtained from a first pre-recorded reference acceleration vector information ($S_1$) of the vehicle being in a first state and a second pre-recorded reference acceleration vector information ($S_2$) of the vehicle being in a second state different from the first state only in a pitch angle, and also determines an optical axis position of the vehicle lamp. The transmission section (228L3, 228R3) transmits the determined optical axis position to an optical axis adjustment section (236).

15 Claims, 6 Drawing Sheets

CONTROL APPARATUS FOR VEHICLE LAMP, VEHICLE LIGHTING SYSTEM, AND VEHICLE LAMP

BACKGROUND OF THE INVENTION

1. Field of the Invention

The present invention relates to a control apparatus for a vehicle lamp, a vehicle lighting system, and a vehicle lamp.

2. Related Art

Conventionally, there is known auto-leveling control which automatically adjusts an optical axis position of a vehicle headlamp to change an emitting direction in accordance with a tilt angle of a vehicle. In general, in the auto-leveling control, a vehicle height sensor is used as a tilt detection device for a vehicle, and an optical axis position of a headlamp is adjusted on the basis of a pitch angle of a vehicle detected by the vehicle height sensor. In contrast to this, Patent Document 1 discloses a configuration in which the auto-leveling control is performed by using a gravity sensor as the tilt detection device. In addition, Patent Document 2 discloses a configuration in which the auto-leveling control is performed by using a three-dimensional gyro sensor as the tilt detection device.

Patent Document 1: JP-A-2000-085459
Patent Document 2: JP-A-2004-314856

In the case where an acceleration sensor such as the gravity sensor or the three-dimensional gyro sensor is used as the tilt detection device for a vehicle, an auto-leveling system can be provided at lower cost than in the case where the vehicle height sensor is used, and a reduction in the weight thereof can also be achieved. On the other hand, even in the case where the acceleration sensor is used, there is a request for performing the auto-leveling control with enhanced precision by reducing a detection error of a tilt angle of a vehicle resulting from an attachment error of the sensor to the vehicle.

SUMMARY OF THE INVENTION

One or more embodiments of the invention provide technologies which allows execution of auto-leveling control which acquire a tilt angle of a vehicle from a tilt detection device to adjust an optical axis position of a vehicle lamp with enhanced precision.

In accordance with one or more embodiments of the invention, a control apparatus of a vehicle lamp may include a reception section 228L1, 228R1, a control section 228, 228L, 228R, and a transmission section 228L3, 228R3. The reception section 228L1, 228R1 may be configured to receive a tilt angle of a vehicle relative to a horizontal plane from a tilt detection device 316. A control section 228, 228L, 228R may be configured to correct the tilt angle of the vehicle obtained from the tilt detection device 316 based on correction information obtained from a first pre-recorded reference acceleration vector information $S_1$ of the vehicle being in a first state and a second pre-recorded reference acceleration vector information $S_2$ of the vehicle being in a second state different from the first state only in a pitch angle, and to determine an optical axis position of the vehicle lamp. The transmission section 228L3, 228R3 may be configured to transmit the determined optical axis position to an optical axis adjustment section 236.

Other aspects and advantages of the invention will be apparent from the following description and the appended claims.

DETAILED DESCRIPTION OF EXEMPLARY EMBODIMENT

The description will be given hereinbelow on the basis of an exemplary embodiment and modifications thereof with reference to the drawings. The same or equivalent elements, members, and processes shown in the drawings are designated by common reference numerals, and repeated descriptions thereof will be appropriately omitted. In addition, the exemplary embodiment and the modifications are not intended to limit the invention but to serve as an example thereof, and all features or combinations thereof described in the exemplary embodiment and the modifications are not always essential to the invention.

Exemplary Embodiment

Figure 1:
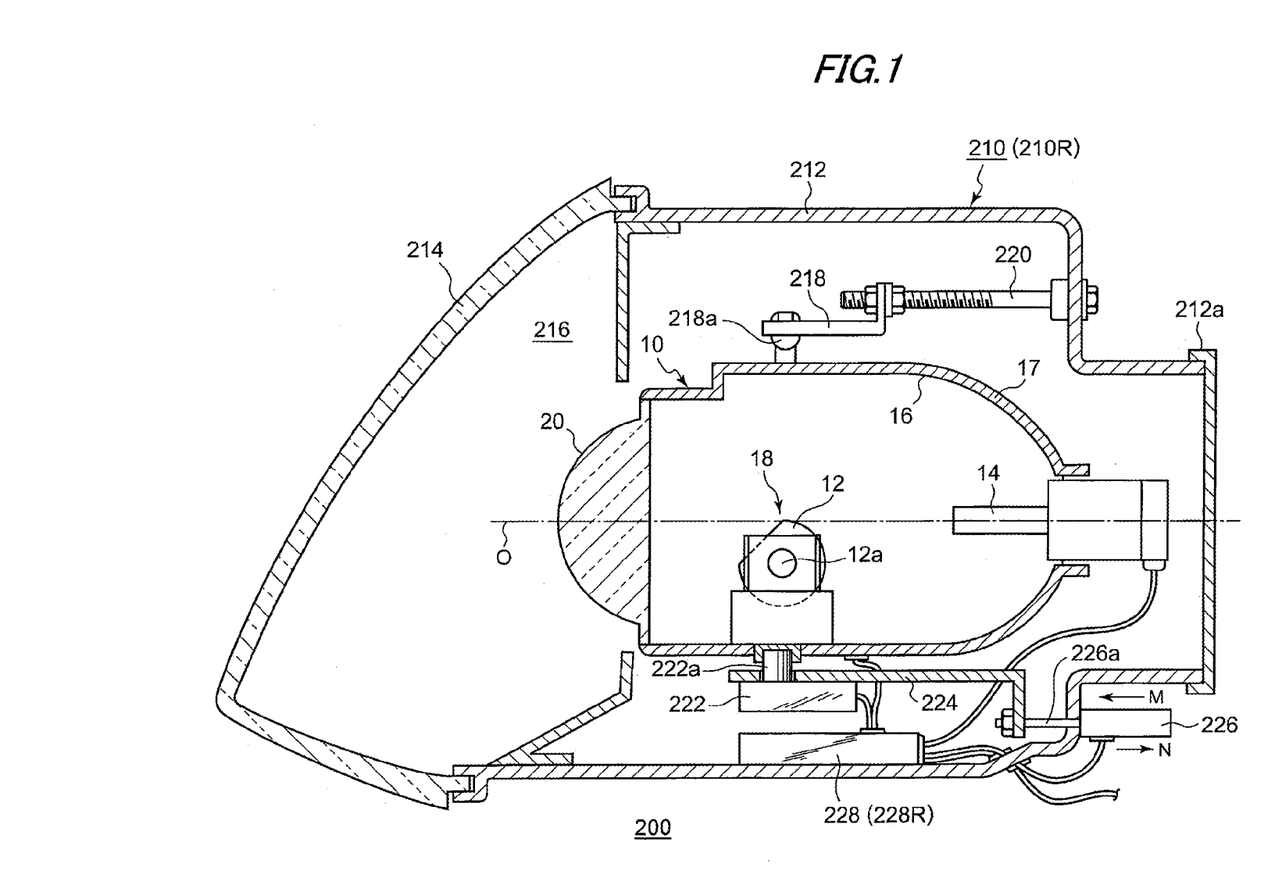
FIG. 1 is a schematic vertical cross-sectional view explaining an internal structure of a vehicle lighting system according to an exemplary embodiment.

FIG. 1 is a schematic vertical cross-sectional view explaining an internal structure of a vehicle lighting system according to an exemplary embodiment. A vehicle lighting system 200 of the exemplary embodiment is a light distribution variable headlamp system in which a pair of symmetrically formed headlamp units are disposed each on the left and the right of a vehicle in a vehicle width direction.

The headlamp units disposed on the right and the left have substantially the same configuration except that they have structures symmetrical to each other, and hence the structure of a headlamp unit 210R on the right side will be described hereinbelow, and the description of the headlamp unit on the left side will be appropriately omitted. It is to be noted that, when members of the headlamp unit on the left side are described, the individual members thereof are designated by the same reference numerals as those of the corresponding members of the headlamp unit 210R for the sake of convenience of explanation.

The headlamp unit 210R includes a lamp body 212 having an opening portion on a forward side of a vehicle, and a transparent cover 214 covering the opening portion. The lamp body 212 has a detachable cover 212a which can be detached at the time of replacement of a bulb 14 or the like on its rearward side of the vehicle. A lighting chamber 216 is formed of the lamp body 212 and the transparent cover 214. In the lighting chamber 216, there is accommodated a lighting unit 10 (vehicle lamp) which emits light in a forward direction of the vehicle.

In a part of the lighting unit 10, there is formed a lamp bracket 218 having a pivot mechanism 218a serving as a swing center in vertical and lateral directions of the lighting unit 10. The lamp bracket 218 is screwed with an aiming adjustment screw 220 which is rotatably held on a wall surface of the lamp body 212. Accordingly, the lighting unit 10 is fixed to a predetermined position in the lighting chamber 216 determined by an adjustment state of the aiming adjustment screw 220, and an attitude thereof can be changed to a forwardly tilted attitude or a rearwardly tilted attitude relative to the position about the pivot mechanism 218a.

In addition, to a lower surface of the lighting unit 10, there is fixed a rotational shaft 222a of a swivel actuator 222 for configuring an adaptive front-lighting system (AFS) for a curved road which illuminates a traveling direction during running on a curved road or the like. The swivel actuator 222 causes the lighting unit 10 to swivel to the traveling direction about the pivot mechanism 218a on the basis of data on a steering amount provided from a vehicle side, data on a shape of a running road provided from a navigation system, and a relative positional relationship between a forward vehicle including an oncoming vehicle and a preceding vehicle, and an own vehicle. As a result, an illumination area of the lighting unit 10 is directed not to the front of the vehicle but to an onward part of a curve on the curved road so that forward visibility of a driver is improved. The swivel actuator 222 can be configured of, e.g., a stepping motor. It is to be noted that a solenoid or the like can also be used when a swivel angle is set to a fixed value. The swivel actuator 222 is fixed to a unit bracket 224.

To the unit bracket 224, there is connected a leveling actuator 226 disposed outside the lamp body 212. The leveling actuator 226 is configured of, e.g., a motor for extending or retracting a rod 226a in an arrow M or N direction. When the rod 226a is extended in the arrow M direction, the lighting unit 10 swings about the pivot mechanism 218a so as to take a rearwardly tilted attitude. Conversely, when the rod 226a is retracted in the arrow N direction, the lighting unit 10 swings about the pivot mechanism 218a so as to take a forwardly tilted attitude. When the lighting unit 10 takes the rearwardly tilted attitude, it is possible to perform a leveling adjustment in which a pitch angle of an optical axis O, i.e., an angle of the optical axis O in a vertical direction is directed upward. On the other hand, when the lighting unit 10 takes the forwardly tilted attitude, it is possible to perform a leveling adjustment in which the pitch angle of the optical axis O is directed downward. By performing such leveling adjustment, an optical axis adjustment in accordance with a vehicle attitude can be performed. As a result, it is possible to adjust a distance reached by forward emitted light by the vehicle lighting system 200 to an optimum distance.

In the inner wall surface of the lighting chamber 216 below the lighting unit 10, there is disposed an illumination control section 228 (control section, control apparatus) for executing turning on/off control of the lighting unit 10, formation control of a light distribution pattern, and an optical axis adjustment of the lighting unit 10. In the case of FIG. 1, an illumination control section 228R for controlling the headlamp unit 210R is disposed. The illumination control section 228R also executes control of the swivel actuator 222 and the leveling actuator 226. It is to be noted that the illumination control section 228R may be provided outside the headlamp unit 210R.

The lighting unit 10 may have an aiming adjustment mechanism. For example, an aiming pivot mechanism (not shown) serving as a swing center during the aiming adjustment is disposed at a connecting portion between the rod 226a of the leveling actuator 226 and the unit bracket 224. In addition, the above-described aiming adjustment screws 220 are disposed in the lamp bracket 218 so as to be spaced apart from each other in the vehicle width direction. When, e.g., two of the aiming adjustment screws 220 are rotated counterclockwise, the lighting unit 10 takes the forwardly tilted attitude about the aiming pivot mechanism so that the optical axis O is adjusted downward. Similarly, when two of the aiming adjustment screws 220 are rotated clockwise, the lighting unit 10 takes the rearwardly tilted attitude about the aiming pivot mechanism so that the optical axis O is adjusted upward. Further, when the aiming adjustment screw 220 on the left side in the vehicle width direction is rotated counterclockwise, the lighting unit 10 takes a rightwardly rotated attitude about the aiming pivot mechanism so that the optical axis O is adjusted rightwardly. Furthermore, when the aiming adjustment screw 220 on the right side in the vehicle width direction is rotated counterclockwise, the lighting unit 10 takes a leftwardly rotated attitude about the aiming pivot mechanism so that the optical axis O is adjusted leftwardly. The aiming adjustment is performed at the time of shipment of the vehicle, automobile inspection, or replacement of the headlamp unit 210R. As a result, the attitude of the headlamp unit 210R is adjusted to an attitude specified in its design, and the formation control of the light distribution pattern and the adjustment control of the optical axis position are performed with the attitude used as a reference.

The lighting unit 10 has a shade mechanism 18 including a rotational shade 12, a bulb 14 as a light source, a lamp housing 17 holding a reflector 16 on an inner wall, and a projection lens 20. As the bulb 14, for example, an incandescent lamp, a halogen lamp, a discharge lamp, and an LED can be used. The exemplary embodiment shows an example in which the bulb 14 is configured of the halogen lamp. The reflector 16 reflects light emitted from the bulb 14. A part of light from the bulb 14 and the light reflected by the reflector 16 is guided to the projection lens 20 via the rotational shade 12.

The rotational shade 12 is a cylindrical member rotatable about a rotational shaft 12a, and has a notched portion which is partially notched in an axial direction, and a plurality of shade plates. The notched portion or any one of the shade plates is moved onto the optical axis O, and a predetermined light distribution pattern is thereby formed. At least a part of the reflector 16 has an elliptical spherical shape, and the elliptical sphere is set such that a cross-sectional shape of the lighting unit 10 including the optical axis O forms at least a part of the elliptical shape. The elliptical spherical portion of the reflector 16 has a first focal point at a substantially central position of the bulb 14, and has a second focal point on a rear focal plane of the projection lens 20.

The projection lens 20 is disposed on the optical axis O extending in a fore-and-aft direction of the vehicle. The bulb 14 is disposed on the rear side of the rear focal plane as the focal plane including the rear focal point of the projection lens 20. The projection lens 20 is formed of a plano-convex aspheric lens having a convex front side surface and a flat rear side surface, and projects a light source image formed on the rear focal plane onto a virtual vertical screen forward of the vehicle lighting system 200 as a reversed image. It is to be noted that the configuration of the lighting unit 10 is not limited thereto, and the lighting unit 10 may be a reflection-type lighting unit without having the projection lens 20.

Figure 2:
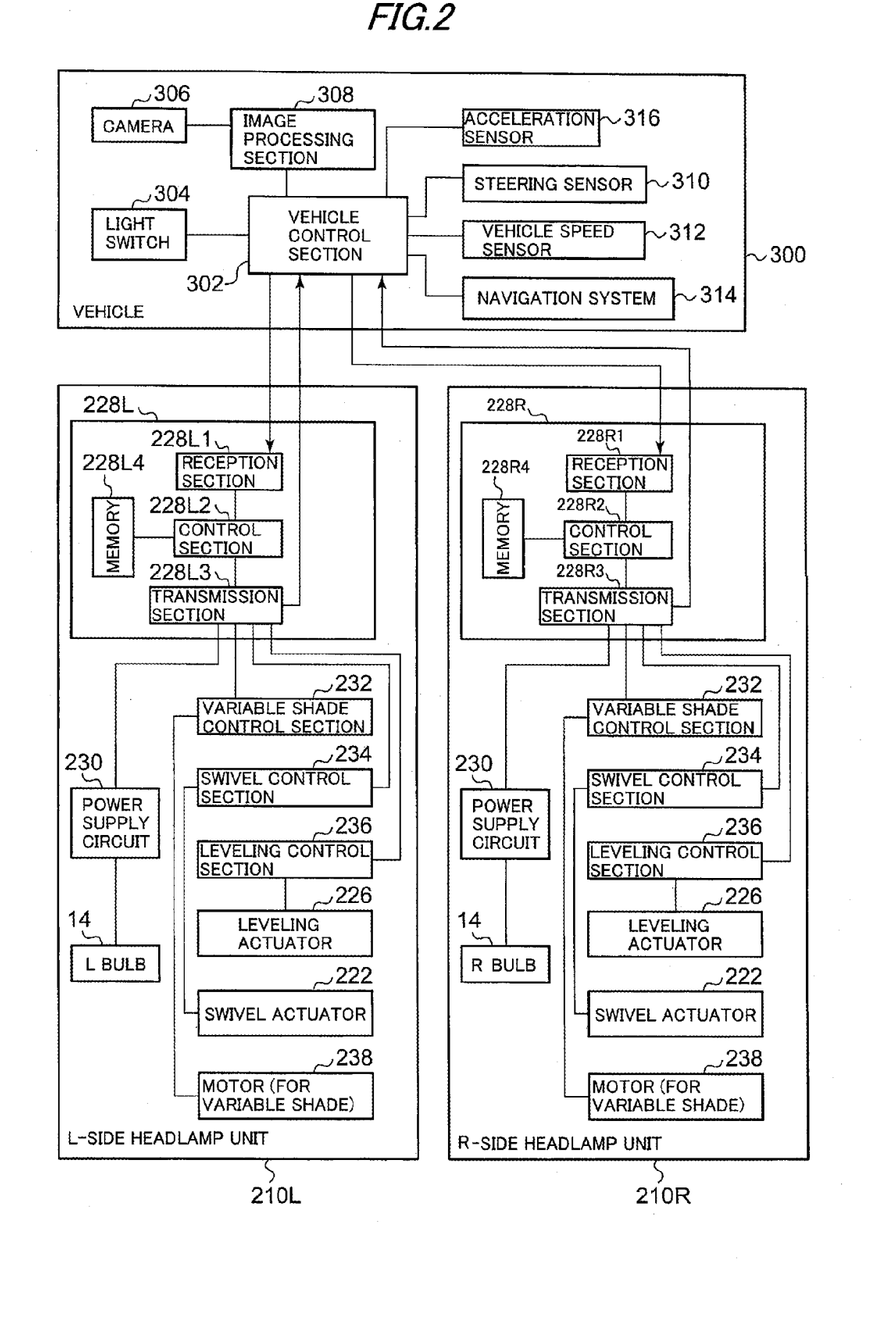
FIG. 2 is a functional block diagram explaining operational coordination between an illumination control section of a headlamp unit and a vehicle control section on a vehicle side.

FIG. 2 is a functional block diagram explaining operational coordination between the illumination control section of the headlamp unit configured as described above and a vehicle control section on the vehicle side. It is to be noted that, as described above, the configuration of the headlamp unit 210R on the right side and that of the headlamp unit 210L on the left side are basically identical so that the description will be given only of the side of the headlamp unit 210R and the description of the side of the headlamp unit 210L will be omitted.

The illumination control section 228R of the headlamp unit 210R has a reception section 228R1, a control section 228R2, a transmission section 228R3, and a memory 228R4. The illumination control section 228R performs control of a power supply circuit 230 on the basis of information obtained from a vehicle control section 302 mounted on a vehicle 300 to execute turning-on control of the bulb 14. In addition, the illumination control section 228R controls a variable shade control section 232, a swivel control section 234, and a leveling control section 236 (optical axis adjustment section) on the basis of the information obtained from the vehicle control section 302. Various information transmitted from the vehicle control section 302 is received by the reception section 228R1, and various control signals are generated from the information and information stored in the memory 228R4 on an as needed basis by the control section 228R2. Subsequently, the control signals are transmitted to the power supply circuit 230 of the lighting unit 10, the variable shade control section 232, the swivel control section 234, and the leveling control section 236 by the transmission section 238R3. The memory 228R4 is, e.g., a nonvolatile memory.

The variable shade control section 232 performs rotation control of a motor 238 connected to the rotational shaft 12a of the rotational shade 12 via a gear mechanism to move the desired shade plate or the notched portion onto the optical axis O. It is to be noted that the variable shade control section 232 is provided with rotation information indicative of a rotation state of the rotational shade 12 from a detection sensor such as an encoder provided in the motor 238 or the rotational shade 12. With this arrangement, precise rotation control by feedback control is implemented. In addition, the swivel control section 234 controls the swivel actuator 222 to adjust the angle of the optical axis O of the lighting unit 10 in the vehicle width direction (lateral direction). For example, at the time of turning such as running on a curved road, turning right or left, or the like, the optical axis O of the lighting unit 10 is directed to a direction in which the vehicle is about to travel.

The leveling control section 236 controls the leveling actuator 226 to adjust the optical axis O of the lighting unit 10 in a vertical direction of the vehicle (pitch angle direction). For example, the leveling control section 236 adjusts the attitude of the lighting unit 10 in accordance with the forward tilt or rearward tilt of the vehicle attitude at the time of acceleration or deceleration, an increase or decrease in an applied load, or an increase or decrease in the number of passengers, and thereby adjusts a distance reached by forward emitted light to be an optimum distance. The vehicle control section 302 provides the same information to the headlamp unit 210L, and the illumination control section 228L (control section, control apparatus) provided in the headlamp unit 210L executes the same control as that of the illumination control section 228R.

In the case of the exemplary embodiment, the light distribution pattern formed by the headlamp units 210L and 210R can be switched in accordance with an operation content of a light switch 304 by a driver. In this case, in accordance with the operation of the light switch 304, the illumination control sections 228L and 228R control the motors 238 via the variable shade control sections 232 to determine the light distribution pattern to be formed by the lighting units 10.

The headlamp units 210L and 210R of the exemplary embodiment may be automatically controlled so as to form the light distribution pattern optimum for the state of the vehicle 300 and surroundings of the vehicle by detecting the surroundings of the vehicle using various sensors without depending on the operation of the light switch 304. For example, when it is detected that a preceding vehicle, an oncoming vehicle, or a pedestrian is present ahead of the own vehicle, the illumination control sections 228L and 228R judge that glare is to be prevented on the basis of the information obtained from the vehicle control section 302, and form a low-beam light distribution pattern using the lighting units 10. On the other hand, when it is detected that the preceding vehicle, the oncoming vehicle, or the pedestrian is not present ahead of the own vehicle, the illumination control sections 228L and 228R judge that visibility of the driver is to be improved, and form a high-beam light distribution pattern which does not involve light blocking by the rotational shades 12. Further, when a conventionally known special high-beam light distribution pattern or special low-beam light distribution pattern can be formed in addition to the low-beam light distribution pattern and the high-beam light distribution pattern, the illumination control sections 228L and 228R may form an optimum light distribution pattern determined in consideration of a forward vehicle in accordance with the state of presence of the forward vehicle. Such control mode is referred to as an ADB (Adaptive Driving Beam) mode in some cases.

In order to detect objects such as the preceding vehicle, the oncoming vehicle, and the like in the above-described manner, a camera 306 such as, e.g., a stereo camera is connected to the vehicle control section 302 as a means for recognizing the objects. Image frame data picked up by the camera 306 is subjected to predetermined image processing such as object recognition processing or the like in an image processing section 308, and the result of the recognition is provided to the vehicle control section 302. For example, when data including a characteristic point indicative of a vehicle which is pre-stored in the vehicle control section 302 is present in the recognition result data provided from the image processing section 308, the vehicle control section 302 recognizes presence of the vehicle, and provides the information to the illumination control sections 228L and 228R. The illumination control sections 228L and 228R receive the information on the vehicle from the vehicle control section 302, determine an optimum light distribution pattern in consideration of the vehicle, and form the light distribution pattern. Herein, the above-mentioned "characteristic point indicative of a vehicle" denotes, e.g., a light point having a luminous intensity of not less than a predetermined value which appears in a presumed presence area of an identification lamp such as a headlamp or a tail lamp of a forward vehicle. In addition, for example, when data including a pre-stored characteristic point indicative of a pedestrian is present in the recognition result data provided from the image processing section 308, the vehicle control section 302 provides the information to the illumination control sections 228L and 228R, and the illumination control sections 228L and 228R form an optimum light distribution pattern determined in consideration of the pedestrian.

In addition, the vehicle control section 302 is also capable of acquiring information from a steering sensor 310, a vehicle speed sensor 312, a navigation system 314, and an acceleration sensor 316 (tilt detection section, tilt detection device) which are mounted on the vehicle 300. As a result, with the information, the illumination control sections 228L and 228R are capable of selecting the light distribution pattern to be formed in accordance with a running state and a running attitude of the vehicle 300, and easily changing the light distribution pattern by changing the directions of the optical axes O. For example, when the vehicle 300 accelerates during its running, the vehicle attitude becomes the rearwardly tilted attitude and, conversely, when the vehicle 300 decelerates, the vehicle attitude becomes the forwardly tilted attitude. Alternatively, when luggage is loaded in a luggage room in the rear of the vehicle, or a passenger is seated in a rear seat, the vehicle attitude becomes the rearwardly tilted attitude and, when the luggage is unloaded, or the passenger in the rear seat gets out of the vehicle, the vehicle attitude is tilted forward from its rearwardly tilted attitude. The emitting direction of the lighting unit 10 changes vertically in correspondence to the attitude state of the vehicle 300, and the forward illumination distance is increased or decreased correspondingly.

Accordingly, the illumination control sections 228L and 228R receive the tilt angle of the vehicle 300 from the acceleration sensor 316 via the vehicle control section 302, and control the leveling actuators 226 via the leveling control sections 236 to set the pitch angles of the optical axes O to an angle in correspondence to the vehicle attitude. Thus, by executing the leveling adjustment of the lighting unit 10 on the basis of the vehicle attitude in real time, it is possible to adjust the distance reached by the forward emitted light to the optimum distance even when the vehicle attitude is changed in accordance with use conditions of the vehicle 300. Such control mode is referred to as an auto-leveling control mode in some cases. The thus-described automatic formation control of the light distribution pattern including various control modes is executed when the automatic formation control of the light distribution pattern is instructed using, e.g., the light switch 304.

Figure 3A:
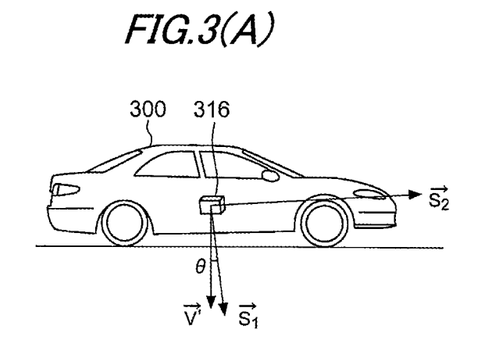
FIGS. 3(A) to 3(C) are schematic views each showing a relationship of vectors in a method for correcting a tilt angle.
Figure 3B:
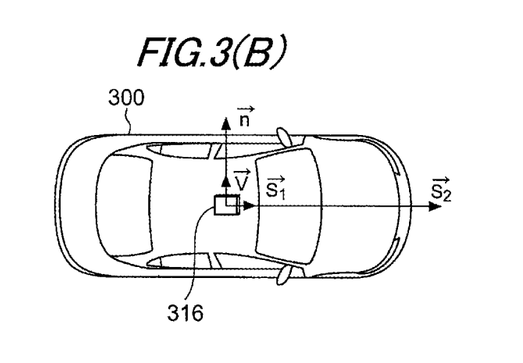
Figure 3C:
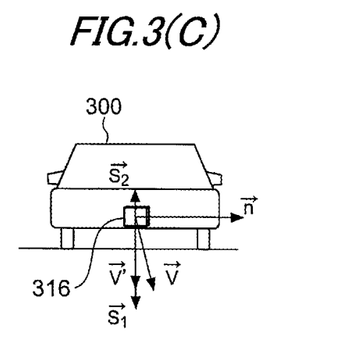

Next, the auto-leveling control by the vehicle lighting system 200 having the above-described configuration will be described in detail. FIGS. 3(A) to 3(C) are schematic views each showing a relationship of vectors in a method for correcting the tilt angle. FIG. 3(A) shows vectors on an XZ axis plane, FIG. 3(B) shows vectors on an XY axis plane, and FIG. 3(C) shows vectors on a YZ axis plane. In the auto-leveling control of the exemplary embodiment, in order to reduce a detection error of the vehicle tilt angle resulting from an attachment error of the acceleration sensor 316, the tilt angle of the vehicle 300 is corrected using correction information obtained from recorded reference acceleration vectors, and the position of the optical axis O is thereby determined.

The acceleration sensor 316 of the vehicle lighting system 200 according to the exemplary embodiment is, e.g., a triaxial acceleration sensor having an X-axis, a Y-axis, and a Z-axis which are mutually orthogonal to each other. The acceleration sensor 316 is attached to the vehicle 300 such that the X-axis of the sensor extends along a fore-and-aft axis of the vehicle 300, the Y-axis thereof extends along a lateral axis of the vehicle 300, and the Z-axis thereof extends along a vertical axis of the vehicle 300. The acceleration sensor 316 is capable of detecting a combined acceleration vector in which a gravity acceleration vector is combined with a motion acceleration vector resulting from the movement of the vehicle 300, and outputs values of elements of the combined acceleration vectors in triaxial directions. When the vehicle 300 is stationary, the acceleration sensor 316 outputs values of the individual elements of the gravity acceleration vectors in the triaxial directions. The illumination control section 228R detects the tilt angle of the vehicle 300 in a pitch angle direction from the vector elements.

In the auto-leveling control of the exemplary embodiment, by using correction information obtained from a pre-recorded first reference acceleration vector of a vehicle in a first state and a pre-recorded second reference acceleration vector of the vehicle in a second state, the current tilt angle of the vehicle 300 obtained from the acceleration sensor 316 is corrected, and the optical axis position of the lighting unit 10 is determined. The first reference acceleration vector and the second reference acceleration vector are generated in the following manner.

First, a state where the vehicle 300 is set on a horizontal plane in, e.g., a manufacturing factory of a vehicle manufacturer or a garage of a dealer is assumed to be the first state. The first state is assumed to be a state where one passenger is seated in a driver's seat of the vehicle 300, or no passenger is present. By a switch operation of an initialization process apparatus in the factory, or communication of a CAN (Controller Area Network) system for connecting the illumination control section 228R and the acceleration sensor 316 via the vehicle control section 302, a first initialization signal is transmitted to the illumination control section 228R. The first initialization signal transmitted to the illumination control section 228R is sent to the control section 228R2 from the reception section 228R1. Upon reception of the first initialization signal, the control section 228R2 records an output value of the acceleration sensor 316 received by the reception section 228R1 as a first reference acceleration vector $S_1=(X_1, Y_1, Z_1)$ in the memory 228R4. As the first reference acceleration vector $S_1$, there is used, e.g., an average of the output values of the acceleration sensor 316 received for about 1 second after the illumination control section 228R has received the first initialization signal. An initial aiming adjustment using the first reference acceleration vector $S_1$ is performed on an as needed basis.

Next, when a load is applied to the front portion or the rear portion of the vehicle 300 in the first state, the vehicle 300 is assumed to be in the second state. The second state is a state different from the first state only in the pitch angle. In the exemplary embodiment, when a weight or a passenger is positioned in a rear luggage room or a rear seat of the vehicle 300 in the first state, the vehicle 300 is assumed to be in the second state. When detecting that the output value of the acceleration sensor 316 is changed by an amount not less than a predetermined amount and then stabilized, the illumination control section 228R records the output value of the acceleration sensor 316 as a second reference acceleration vector $S_2=(X_2, Y_2, Z_2)$ in the memory 228R4. As the second reference acceleration vector $S_2$, there is used, e.g., an average of the output values of the acceleration sensor 316 received for about 1 second after it has been detected that the output value of the acceleration sensor 316 has been changed by the amount not less than the predetermined amount and then stabilized. The illumination control section 228R is able to recognize that the vehicle 300 is in the second state by detecting the change of the sensor output value by the amount not less than the predetermined amount and the stabilization thereof. The determination of the above-mentioned "predetermined amount" and the above-mentioned "stabilization" can be appropriately set on the basis of an experiment and a simulation by a designer. In addition, the above-mentioned "state different from the first state only in the pitch angle" is a state where only the pitch angle is substantially changed, and also includes a state where a state change other than the change of the pitch angle occurs within a range which does not affect the recording of the second reference acceleration vector $S_2$.

In this manner, the first and second reference acceleration vectors $S_1$ and $S_2$ are pre-recorded. Then, in the situation where the vehicle 300 is actually used, when the current tilt angle of the vehicle 300 is obtained from the acceleration sensor 316, the illumination control section 228R corrects the current tilt angle of the vehicle using the correction information obtained from the recorded first and second reference acceleration vectors $S_1$ and $S_2$.

By acquiring the first reference acceleration vector $S_1$, it is possible to detect the attachment error of the acceleration sensor 316 relative to the horizontal plane to perform the aiming adjustment. However, there is a case where it is not possible to grasp displacements between the fore-and-aft, lateral, and horizontal axes of the vehicle 300 and the X-, Y-, and Z-axes of the acceleration sensor 316 only with the first reference acceleration vector $S_1$. For example, when the acceleration sensor 316 is attached horizontally relative to the horizontal plane, i.e., when the vertical axis of the vehicle 300 matches the Z-axis of the acceleration sensor 316, the first reference acceleration vector $S_1$ is (0, 0, 1). In this case, even when the acceleration sensor 316 rotates about the Z-axis, detected values of the X-axis element and the Y-axis element of the acceleration sensor 316 remain 0. Consequently, even when the X-axis and Y-axis of the acceleration sensor 316 are displaced from the fore-and-aft axis and the lateral axis of the vehicle, the displacements can not be detected. When the X-axis and the Y-axis of the acceleration sensor 316 are displaced from the fore-and-aft axis and the lateral axis of the vehicle, it is difficult to precisely grasp the change of the pitch angle of the vehicle 300.

In contrast to this, in the exemplary embodiment, the first reference acceleration vector $S_1$ in the first state and the second reference acceleration vector $S_2$ in the second state where only the pitch angle is changed from the first state are used for the correction of the vehicle tilt angle. As described above, since only the pitch angle is changed from the first state in the second state, when an output value vector of the acceleration sensor 316 changes in a plane including the first and second reference acceleration vectors $S_1$ and $S_2$, it is indicated that the attitude of the vehicle 300 is changed in the pitch angle direction. On the other hand, when the output value vector of the acceleration sensor 316 is out of the plane, it is indicated that the attitude of the vehicle 300 is changed at least in a roll direction. Consequently, by correcting the output value vector of the acceleration sensor 316 indicative of the current tilt angle of the vehicle 300 to a vector included in the plane including the first and second reference acceleration vectors $S_1$ and $S_2$, it is possible to precisely grasp the change of the vehicle 300 in the pitch angle direction.

The description will be given of a method for correcting the current tilt angle and a method for determining the optical axis position with reference to FIGS. 3(A) to 3(C). First, the illumination control section 228R calculates a normal vector n which is a vector perpendicular to the plane including the first and second reference acceleration vectors $S_1$ and $S_2$. The normal vector n is determined using a vector product of the first and second reference acceleration vectors $S_1$ and $S_2$, and is represented by the following Expression (1).

[Expression 1]

$$\vec{n} = \vec{S}_1 \times \vec{S}_2 \quad (1)$$

$\vec{n}$: normal vector
$\vec{S}_1$: first reference acceleration vector
$\vec{S}_2$: second reference acceleration vector Next, the illumination control section 228R calculates a unit normal vector $n_e$ having the same direction as that of the normal vector n and the magnitude of 1. The unit normal vector $n_e$ is determined by the following Expression (2).

[Expression 2]

$$\vec{n}_e = \vec{n} / |\vec{n}| \quad (2)$$

$\vec{n}_e$: unit normal vector

Subsequently, the illumination control section 228R calculates an element (in-plane element vector) V' included in the plane including the first and second reference acceleration vectors $S_1$ and $S_2$ in a current output value vector V of the acceleration sensor 316. The in-plane element vector V' is determined using a scalar product, and is represented by the following Expression (3).

[Expression 3]

$$\vec{V}^1 = \vec{V} - (\vec{n}_e \cdot \vec{V}) \vec{n}_e \quad (3)$$

$\vec{V}^1$: in-plane element vector
$\vec{V}$: current output value vector of acceleration sensor An angle formed by the first reference acceleration vector $S_1$ and the in-plane element vector V' is a current pitch angle θ of the vehicle 300. The illumination control section 228R calculates tan θ required for the auto-leveling control on the basis of the following Expression (4).

[Expression 4]

$$\tan\theta = \frac{\sin\theta}{\cos\theta} = \text{sign}((\vec{S}_1 \times \vec{V}^1) \cdot \vec{n}_e) \frac{|\vec{S}_1 \times \vec{V}^1|}{\vec{S}_1 \cdot \vec{V}^1} \quad (4)$$

sign:
1 when $(\vec{S}_1 \times \vec{V}^1) \cdot \vec{n}_e > 0$ is satisfied
0 when $(\vec{S}_1 \times \vec{V}^1) \cdot n_e = 0$ is satisfied
−1 when $(\vec{S}_1 \times \vec{V}^1) \cdot \vec{n}_e < 0$ is satisfied The illumination control section 228R determines the position of the optical axis O of the lighting unit 10 on the basis of tan θ obtained in this manner. The position of the optical axis O determined by the illumination control section 228R is transmitted to the leveling control section 236 by the transmission section 228R3. The leveling control section 236 controls the leveling actuator 226 in accordance with the received position of the optical axis O to adjust the optical axis O to the angle in correspondence to the current tilt angle of the vehicle 300. In the exemplary embodiment, the normal vector n and the unit normal vector $n_e$ are included in the correction information obtained from the first and second reference acceleration vectors $S_1$ and $S_2$. It is to be noted that the normal vector n and the unit normal vector $n_e$ can be pre-recorded in the memory 228R4.

Figure 4:
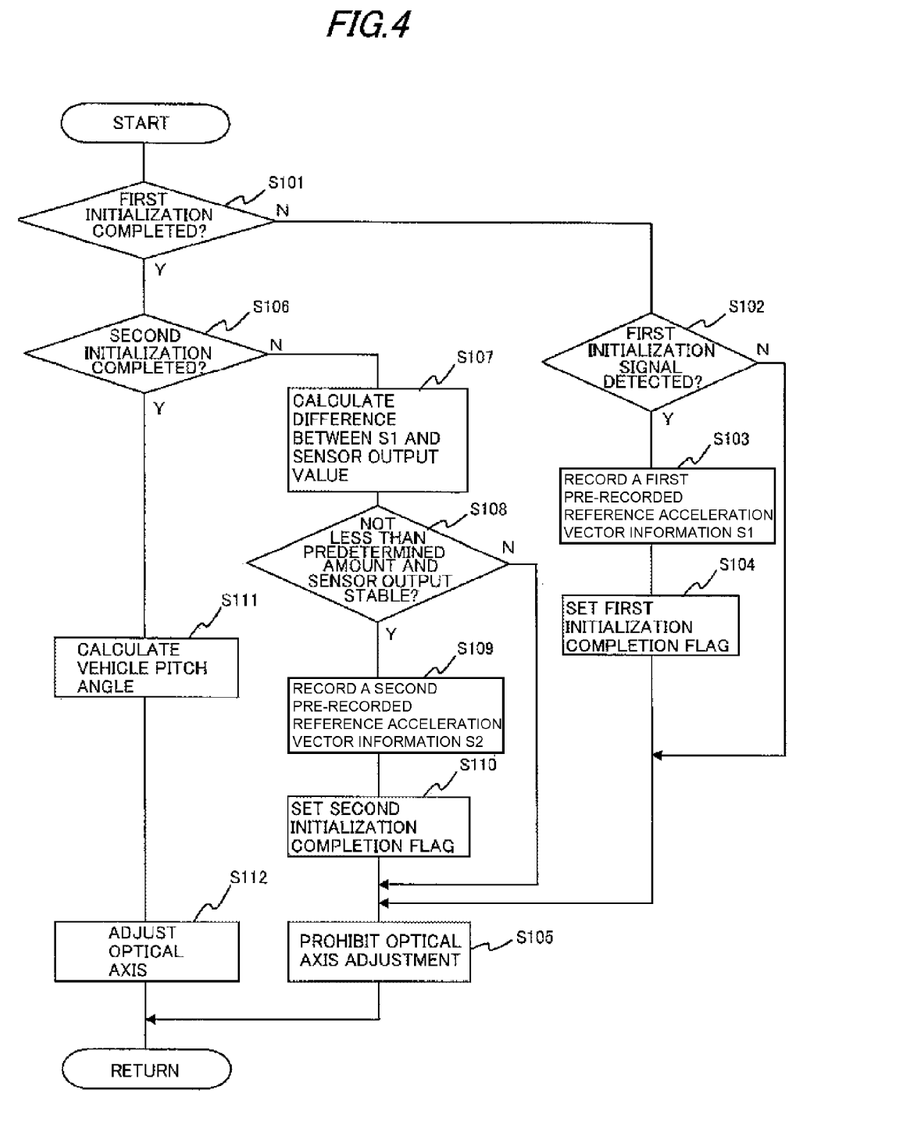
FIG. 4 is a flowchart of auto-leveling control of the vehicle lighting system according to the exemplary embodiment.

FIG. 4 is a flowchart of the auto-leveling control of the vehicle lighting system according to the exemplary embodiment. In the flowchart of FIG. 4, process procedures in the individual sections are represented by a combination of S (initial letter of Step) meaning a step and a number. In addition, when any judgment process is executed in the process represented by the combination of S and the number and the judgment result is positive, Y (initial letter of Yes) is added, and the judgment result is represented by, e.g., (Y of S101). Conversely, when the judgment result is negative, N (initial letter of No) is added, and the judgment result is represented by, e.g., (N of S101). The illumination control section 228R repeatedly executes this flow at a predetermined timing when the execution of the auto-leveling control mode is instructed using, e.g., the light switch 304.

First, the illumination control section 228R determines whether or not a first initialization completion flag is set to judge whether or not the first initialization is completed (S101). When the first initialization is not completed (N of S101), the illumination control section 228R judges whether or not the first initialization signal is detected (S102). When the first initialization signal is detected (Y of S102), the illumination control section 228R records the output value of the acceleration sensor 316 as the first reference acceleration vector $S_1$ (S103). Subsequently, the illumination control section 228R sets the first initialization completion flag (S104), prohibits the adjustment of the optical axis O (S105), and terminates the present routine. When the first initialization signal is not detected (N of S102), the illumination control section 228R prohibits the adjustment of the optical axis O without recording the first reference acceleration vector $S_1$ (S105), and terminates the present routine.

When the first initialization is completed (Y of S101), the illumination control section 228R determines whether or not a second initialization completion flag is set to judge whether or not the second initialization is completed (S106). When the second initialization is not completed (N of S106), the illumination control section 228R calculates a difference between the first reference acceleration vector $S_1$ and the current output value of the acceleration sensor 316 (S107), and judges whether or not the difference is not less than a predetermined amount and the output value of the acceleration sensor 316 is stable (S108). When the difference is not less than the predetermined amount and the sensor output value is stable (Y of S108), the illumination control section 228R records the output value of the acceleration sensor 316 as the second reference acceleration vector $S_2$ (S109). Subsequently, the illumination control section 228R sets the second initialization completion flag (S110), prohibits the adjustment of the optical axis O (S105), and terminates the present routine. When the difference is less than the predetermined amount, or the sensor output value is unstable (N of S108), the illumination control section 228R prohibits the adjustment of the optical axis O without recording the second reference acceleration vector $S_2$ (S105), and terminates the present routine.

When the second initialization is completed (Y of S106), the illumination control section 228R corrects the current output value of the acceleration sensor 316, and calculates the pitch angle of the vehicle 300 (S111). Subsequently, the illumination control section 228R adjusts the optical axis O of the lighting unit 10 to conform to the position of the optical axis O determined in accordance with the obtained pitch angle (S112), and terminates the present routine.

It is to be noted that, as for the headlamp unit 210L on the left side, the illumination control section 228L executes the same control. Alternatively, a configuration may also be adopted in which one of the illumination control sections 228L and 228R determines the positions of the optical axes O, and the other one thereof acquires the determined positions of the optical axes O to adjust the optical axes O.

In contrast to the above-described exemplary embodiment, there may be first and second modifications as follows.

<First Modification>

In the above-described exemplary embodiment, after the first reference acceleration vector $S_1$ has been recorded, when the output value of the acceleration sensor 316 is changed by the amount not less than the predetermined amount and then stabilized, the second reference acceleration vector $S_2$ is recorded. However, the second reference acceleration vector $S_2$ may be recorded in the following manner. That is, after the first reference acceleration vector $S_1$ has been recorded, the second initialization signal is transmitted to the illumination control section 228R using the switch operation of the initialization process apparatus in the factory or the communication of the CAN system. Subsequently, the illumination control section 228R records the second reference acceleration vector $S_2$ after receiving the second initialization signal. As the second reference acceleration vector $S_2$, there is used, e.g., an average of the output values of the acceleration sensor 316 received for about 1 second after the illumination control section 228R has received the second initialization signal.

Figure 5:
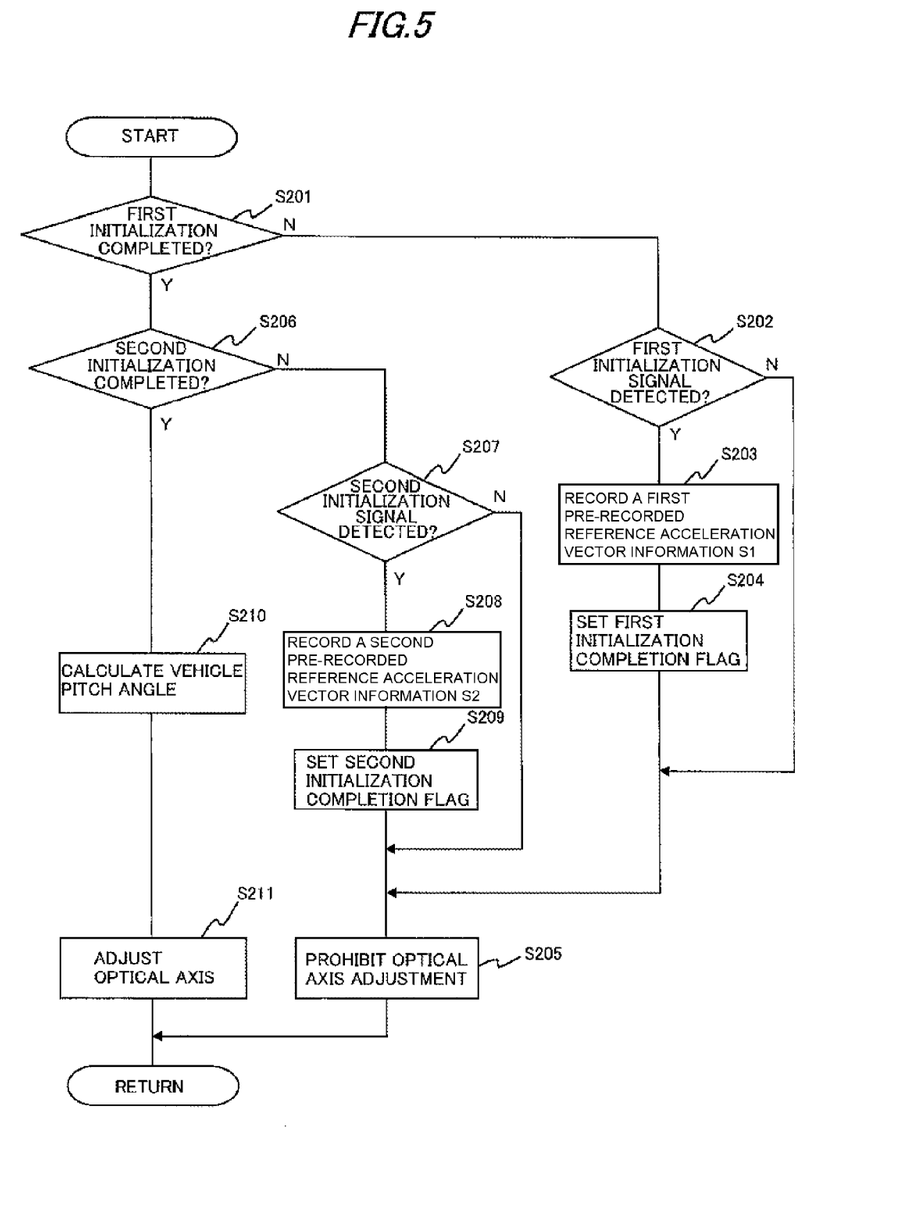
FIG. 5 is a flowchart of the auto-leveling control of a vehicle lighting system according to a first modification.

FIG. 5 is a flowchart of the auto-leveling control of a vehicle lighting system according to a first modification. First, the illumination control section 228R judges whether or not the first initialization is completed (S201). When the first initialization is not completed (N of S201), the illumination control section 228R judges whether or not the first initialization signal is detected (S202). When the first initialization signal is detected (Y of S202), the illumination control section 228R records the output value of the acceleration sensor 316 as the first reference acceleration vector $S_1$ (S203). Subsequently, the illumination control section 228R sets the first initialization completion flag (S204), prohibits the adjustment of the optical axis O (S205), and terminates the present routine. When the first initialization signal is not detected (N of S202), the illumination control section 228R prohibits the adjustment of the optical axis O without recording the first reference acceleration vector $S_1$ (S205), and terminates the present routine.

When the first initialization is completed (Y of S201), the illumination control section 228R judges whether or not the second initialization is completed (S206). When the second initialization is not completed (N of S206), the illumination control section 228R judges whether or not the second initialization signal is detected (S207). When the second initialization signal is detected (Y of S207), the illumination control section 228R records the output value of the acceleration sensor 316 as the second reference acceleration vector $S_2$ (S208). Subsequently, the illumination control section 228R sets the second initialization completion flag (S209), prohibits the adjustment of the optical axis O (S205), and terminates the present routine. When the second initialization signal is not detected (N of S207), the illumination control section 228R prohibits the adjustment of the optical axis O without recording the second reference acceleration vector $S_2$ (S205), and terminates the present routine.

When the second initialization is completed (Y of S206), the illumination control section 228R corrects the current output value of the acceleration sensor 316, and calculates the pitch angle of the vehicle 300 (S210). Subsequently, the illumination control section 228R adjusts the optical axis O of the lighting unit 10 to conform to the position of the optical axis O determined in accordance with the obtained pitch angle (S211), and terminates the present routine.

<Second Modification>

In the above-described exemplary embodiment, the second state is created by applying the load to the front portion or the rear portion of the vehicle 300 in the first state. However, the second state may be created in the following manner. That is, the first state is assumed to be a state where the vehicle 300 is stationary, and the second state may be created by causing the vehicle 300 to move forward or backward. By causing the vehicle 300 to move forward or backward, the pitch angle of the vehicle 300 can be increased or decreased. When the illumination control section 228R detects that a change amount of the vehicle speed per unit time detected by the vehicle speed sensor 312 is not less than a predetermined amount, the illumination control section 228R records the output value of the acceleration sensor 316 as the second reference acceleration vector $S_2$. As the second reference acceleration vector S2, there is used, e.g., an average of the output values of the acceleration sensor 316 received for about 1 second after the illumination control section 228R has detected that the change amount of the vehicle speed per unit time has been not less than the predetermined amount. By detecting that the change amount of the vehicle speed per unit time is not less than the predetermined amount, the illumination control section 228R is able to recognize that the vehicle 300 is in the second state. The above-mentioned "predetermined amount" can be appropriately set on the basis of an experiment or a simulation by a designer.

Figure 6:
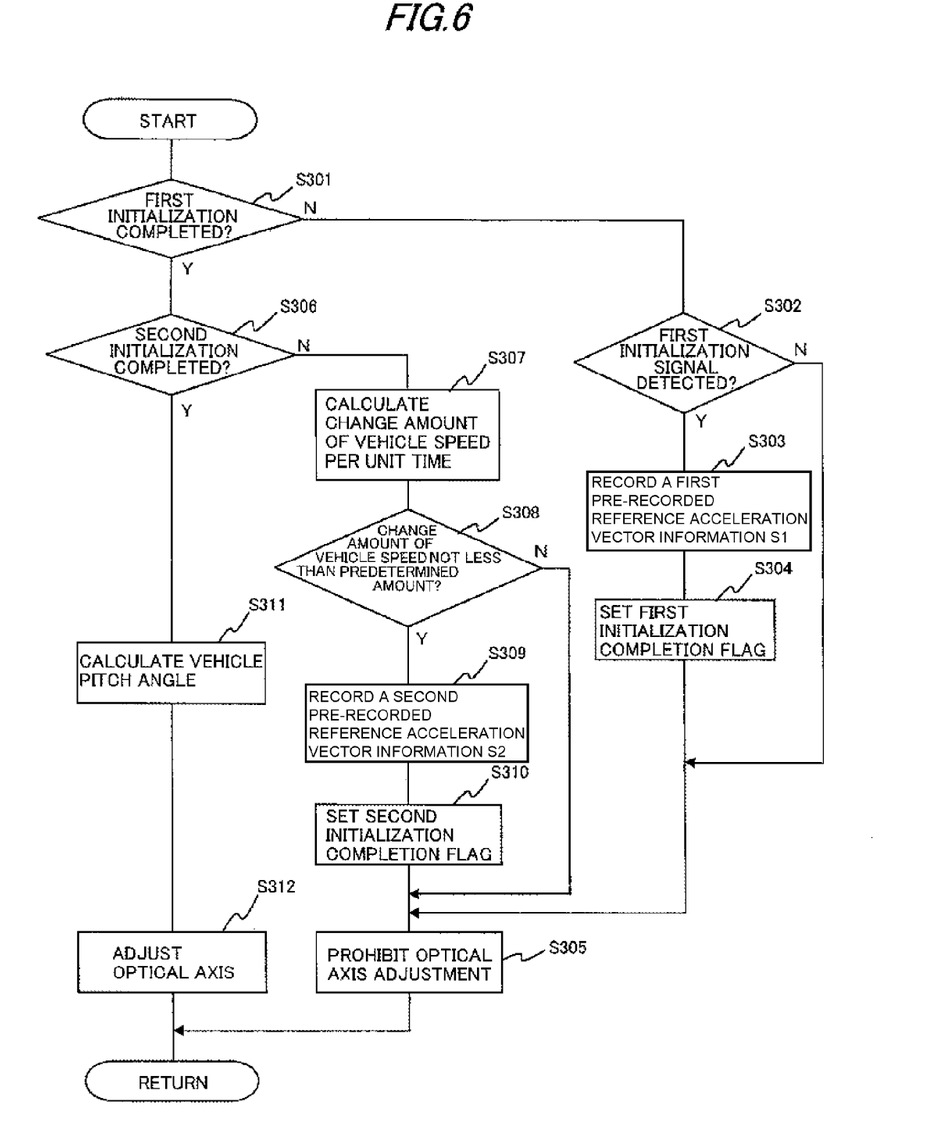
FIG. 6 is a flowchart of the auto-leveling control of a vehicle lighting system according to a second modification.

FIG. 6 is a flowchart of the auto-leveling control of a vehicle lighting system according to a second modification. First, the illumination control section 228R judges whether or not the first initialization is completed (S301). When the first initialization is not completed (N of S301), the illumination control section 228R judges whether or not the first initialization signal is detected (S302). When the first initialization signal is detected (Y of S302), the illumination control section 228R records the output value of the acceleration sensor 316 as the first reference acceleration vector $S_1$ (S303). Subsequently, the illumination control section 228R sets the first initialization completion flag (S304), prohibits the adjustment of the optical axis O (S305), and terminates the present routine. When the first initialization signal is not detected (N of S302), the illumination control section 228R prohibits the adjustment of the optical axis O without recording the first reference acceleration vector $S_1$ (S305), and terminates the present routine.

When the first initialization is completed (Y of S301), the illumination control section 228R judges whether or not the second initialization is completed (S306). When the second initialization is not completed (N of S306), the illumination control section 228R calculates the change amount of the vehicle speed per unit time (S307), and judges whether or not the change amount of the vehicle speed is not less than the predetermined amount (S308). When the change amount of the vehicle speed is not less than the predetermined amount (Y of S308), the illumination control section 228R records the output value of the acceleration sensor 316 as the second reference acceleration vector $S_2$ (S309). Subsequently, the illumination control section 228R sets the second initialization completion flag (S310), prohibits the adjustment of the optical axis O (S305), and terminates the present routine. When the change amount of the vehicle speed is less than the predetermined amount (N of S308), the illumination control section 228R prohibits the adjustment of the optical axis O without recording the second reference acceleration vector $S_2$ (S305), and terminates the present routine.

When the second initialization is completed (Y of S306), the illumination control section 228R corrects the current output value of the acceleration sensor 316, and calculates the pitch angle of the vehicle 300 (S311). Subsequently, the illumination control section 228R adjusts the optical axis O of the lighting unit 10 to conform to the position of the optical axis O determined in accordance with the obtained pitch angle (S312), and terminates the present routine.

As in the exemplary embodiment and the first modification, according to the method in which the second state is created by applying the load to the front portion or the rear portion of the vehicle 300, it is possible to change only the pitch angle of the vehicle with high precision. On the other hand, as in the second modification, according to the method in which the second state is created by causing the vehicle to move forward or backward, it is possible to use a state where the vehicle 300 is allowed to move by its own driving force on an assembly line in a manufacturing factory as the second state, and hence it is possible to suppress an increase in the number of steps of the auto-leveling control.

As has been described above, in the vehicle lighting system 200 according to the exemplary embodiment, the illumination control section 228 corrects the current tilt angle of the vehicle 300 using the correction information obtained from the first reference acceleration vector $S_1$ of the vehicle 300 in the first state and the second reference acceleration vector $S_2$ of the vehicle 300 in the second state different from the first state only in the pitch angle. Subsequently, the illumination control section 228 determines the position of the optical axis O by using the corrected tilt angle. Consequently, it is possible to perform the auto-leveling control which acquires the tilt angle of the vehicle 300 from the acceleration sensor 316 as the tilt detection device to adjust the optical axis position of the lighting unit 10 with enhanced precision. In addition, in the exemplary embodiment, since the tilt angle of the vehicle 300 is detected by using the acceleration sensor 316, it is not necessary to use the vehicle height sensor. Consequently, the case of the exemplary embodiment is advantageous in terms of a reduction in cost, and flexibility in designing a vehicle body is high as compared with the case where the vehicle height sensor is used.

It is to be noted that the vehicle lighting system 200 according to the exemplary embodiment is one aspect of the present invention. The vehicle lighting system 200 includes the lighting unit 10 capable of adjusting the optical axis O, the acceleration sensor 316 (tilt detection section) capable of detecting the tilt angle of the vehicle 300 relative to the horizontal plane, and the illumination control section 228 for controlling the lighting unit 10, and the above-described tilt angle correction and determination of the optical axis position are performed by the illumination control section 228.

Another aspect of the present invention is the illumination control section 228 as the control apparatus. The illumination control section 228 includes the reception sections 228L1 and 228R1 each for receiving the tilt angle of the vehicle from the acceleration sensor 316, the control sections 228L2 and 228R2 each for performing the above-described tilt angle correction and determination of the optical axis position, and the transmission sections 228L3 and 228R3 each for transmitting the determined optical axis position to the leveling control section 236. The illumination control section 228 in the vehicle lighting system 200 corresponds to a control section in a broad sense, while the control sections 228L2 and 228R2 in the illumination control section 228 correspond to control sections in a narrow sense.

In addition, still another aspect of the present invention is the lighting unit 10 as the vehicle lamp. In the lighting unit 10, the optical axis O thereof is adjusted in accordance with the pitch angle of the vehicle 300 determined by performing the above-described tilt angle correction.

The present invention is not limited to the above-described exemplary embodiment or the modifications, any appropriate combination of the embodiment and the modifications, and additional modifications such as various design alterations based on the knowledge of those skilled in the art can be made, and such combined or modified embodiments or modifications would also fall within the scope of the present invention. New embodiments created by combining the above-described embodiment with the above-described modifications, and by adding the following modifications would have effects of the embodiment, the modifications, and the modifications to be added.

The judgment of the running state of the own vehicle, the determination of the optical axis position, and the determination of the light distribution pattern in the above-described embodiment and each of the modifications may be performed by either one of the vehicle control section 302 and the illumination control section 228. When the illumination control section 228 performs these judgments, the information from the various sensors and the navigation system is transmitted to the illumination control section 228 via the vehicle control section 302. In addition, when the illumination control section 228 performs these judgments, one or both of the illumination control sections 228L and 228R are capable of performing these judgments. Further, the illumination control section 228 may control the leveling actuators 226 as the optical axis adjustment sections without the intervention of the leveling control sections 236. That is, the illumination control section 228 may function as the leveling control sections 236. When the vehicle control section 302 performs these judgments, the illumination control section 228 controls turning on/off of the bulbs 14, the swivel actuators 222, the leveling actuators 226, and driving of the motors 238 on the basis of instructions from the vehicle control section 302.

DESCRIPTION OF REFERENCE NUMERALS AND SIGNS

O optical axis, 10 lighting unit, 200 vehicle lighting system, 226 leveling actuator, 228, 228L, 228R illumination control section, 228L1, 228R1 reception section, 228L2, 228R2 control section, 228L3, 228R3 transmission section, 236 leveling control section, 300 vehicle, 316 acceleration sensor

What is claimed is:

1. A control apparatus of a vehicle lamp comprising:
a reception section configured to receive acceleration vector information of a vehicle;
a control section configured to obtain a tilt angle of the vehicle relative to a horizontal plane based on the received acceleration vector information and correct the obtained tilt angle of the vehicle based on correction information obtained from first pre-recorded reference acceleration vector of the vehicle being in a first state and second pre-recorded reference acceleration vector of the vehicle being in a second state different from the first state only in a pitch angle, and to determine an optical axis position of the vehicle lamp based on the corrected tilt angle; and
a transmission section configured to transmit the determined optical axis position to an optical axis adjustment section,
wherein each of the acceleration vector information, the first pre-recorded reference acceleration vector, and the second pre-recorded reference acceleration vector includes a gravity acceleration vector.

2. The control apparatus according to claim 1, wherein the first state is a state where the vehicle is on the horizontal plane, and the second state is a state where a load is applied to a front portion or a rear portion of the vehicle.

3. The control apparatus according to claim 1, wherein the first state is a state where the vehicle is stationary, and the second state is a state where the vehicle is moving forward or backward.

4. A vehicle lighting system comprising:
a vehicle lamp in which an optical axis is adjustable;
an acceleration sensor configured to obtain acceleration vector information of a vehicle; and
a control section configured to obtain a tilt angle of the vehicle relative to a horizontal plane based on the acceleration vector information obtained by the acceleration sensor and control the vehicle lamp, wherein
the control section is configured to correct the obtained tilt angle of the vehicle based on correction information obtained from a first pre-recorded reference acceleration vector of the vehicle being in a first state and a second pre-recorded reference acceleration vector of the vehicle being in a second state different from the first state only in a pitch angle, and to determine an optical axis position of the vehicle lamp so as to adjust the optical axis of the vehicle lamp,
wherein each of the acceleration vector information, the first pre-recorded reference acceleration vector, and the second pre-recorded reference acceleration vector includes a gravity acceleration vector.

5. A vehicle lamp in which an optical axis is adjusted in accordance with a pitch angle of a vehicle, wherein
a tilt angle of the vehicle is acquired based on acceleration vector information of the vehicle from an acceleration sensor,
the pitch angle is determined based on a corrected tilt angle obtained by correcting the tilt angle of the vehicle based on correction information obtained from first reference acceleration vector of the vehicle being in a first state and second reference acceleration vector of the vehicle being in a second state different from the first state only in the pitch angle,
wherein each of the acceleration vector information, the first pre-recorded reference acceleration vector, and the second pre-recorded reference acceleration vector includes a gravity acceleration vector.

6. The control apparatus according to claim 1, wherein each of the acceleration vector information, the first pre-recorded reference acceleration vector, and the second pre-recorded reference acceleration vector indicates an acceleration component in a first axis, an acceleration component in a second axis, and an acceleration component in a third axis, and
the first to third axes intersect each other.

7. The control apparatus according to claim 1, wherein the acceleration vector information indicates an acceleration vector including a combined acceleration vector obtained by combining the gravity acceleration vector with a motion acceleration vector resulting from a movement of the vehicle.

8. The control apparatus according to claim 1, wherein the reception section is configured to receive the acceleration vector information from an acceleration sensor.

9. The control apparatus according to claim 1, wherein the first state is a load-free state where the vehicle is on the horizontal plane.

10. The vehicle lighting system according to claim 4, wherein
each of the acceleration vector information, the first pre-recorded reference acceleration vector, and the second pre-recorded reference acceleration vector indicates an acceleration component in a first axis, an acceleration component in a second axis, and an acceleration component in a third axis, and
the first to third axes intersect each other.

11. The vehicle lighting system according to claim 4, wherein the acceleration vector information indicates an acceleration vector including a combined acceleration vector obtained by combining the gravity acceleration vector with a motion acceleration vector resulting from a movement of the vehicle.

12. The vehicle lighting system according to claim 4, wherein the first state is a load-free state where the vehicle is on the horizontal plane.

13. The vehicle lamp according to claim 5, wherein
each of the acceleration vector information, the first reference acceleration vector, and the second reference acceleration vector indicates an acceleration component in a first axis, an acceleration component in a second axis, and an acceleration component in a third axis, and the first to third axes intersect each other.

14. The vehicle lamp according to claim 5, wherein the acceleration vector information indicates an acceleration vector including a combined acceleration vector obtained by combining the gravity acceleration vector with a motion acceleration vector resulting from a movement of the vehicle.

15. The vehicle lamp according to claim 5, wherein the first state is a load-free state where the vehicle is on the horizontal plane.

* * * * *